United States Patent [19]

Alzaidi

[11] 4,235,670

[45] Nov. 25, 1980

[54] METHOD AND APPARATUS FOR MEASURING NEUTRON FLUX

[76] Inventor: Samir A. Alzaidi, 64/22 Raghiba-Khatoon, Baghdad, Iraq

[21] Appl. No.: 842,462

[22] Filed: Oct. 17, 1977

[51] Int. Cl.² .............................................. G21C 17/00
[52] U.S. Cl. .................................................. 176/19 R
[58] Field of Search ............. 176/19 R; 250/390, 391, 250/392

[56] References Cited

U.S. PATENT DOCUMENTS

| | | | |
|---|---|---|---|
| 2,719,823 | 10/1955 | Zinn | 176/19 R |
| 2,931,761 | 4/1960 | Hurwitz | 176/19 J |
| 2,936,274 | 5/1960 | Dessauer | 176/19 R |
| 3,050,624 | 8/1962 | Janner | 176/19 R |
| 3,160,567 | 12/1964 | Steinberg et al. | 176/19 R |
| 3,207,667 | 9/1965 | Campbell | 176/19 R |
| 3,263,081 | 7/1966 | Wisemann et al. | 176/19 R |
| 3,780,292 | 12/1973 | Klar | 176/19 R |

FOREIGN PATENT DOCUMENTS 1275737 12/1960 France .................................. 176/19 R

*Primary Examiner*—Charles T. Jordan
*Assistant Examiner*—S. A. Cangialosi
*Attorney, Agent, or Firm*—Newton, Hopkins & Ormsby

[57] ABSTRACT

A method and an apparatus are disclosed for measuring the neutron flux existing within a nuclear reactor. According to the method of the invention, a neutron sensitive material is inserted into a reactor and electrons emitted by this material are guided, with the aid of a magnetic field, through an evacuated tube to the exterior of the reactor. Detection of these electrons is carried out after they have reached the exterior of the reactor. The apparatus of the invention includes an evacuated tube having a neutron sensitive material adjacent one end thereof. Apparatus is provided for generating an axial magnetic field along the length of the tube for guiding electrons emitted by the neutron sensitive material. A detector is positioned at the opposite end of the tube for sensing the emitted neutron flux.

13 Claims, 7 Drawing Figures

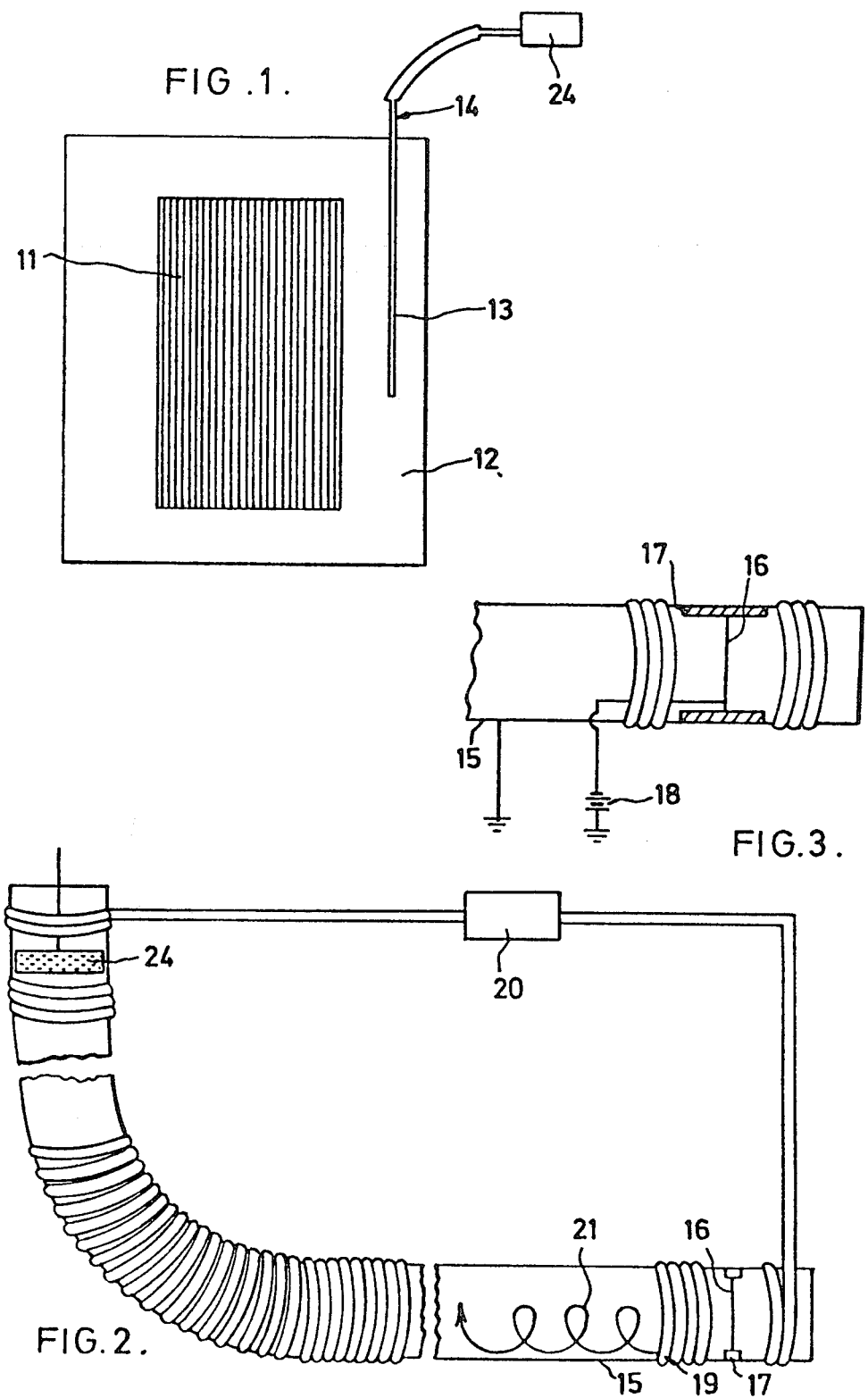

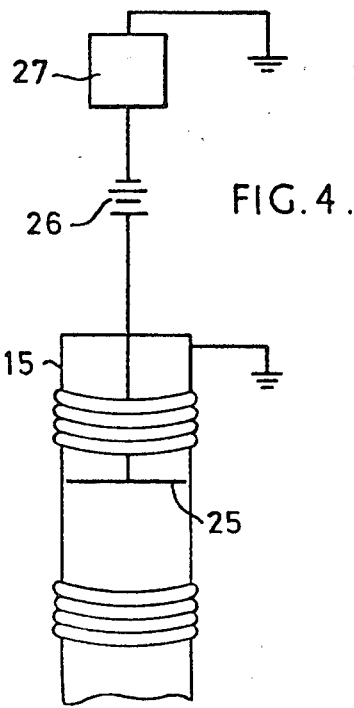
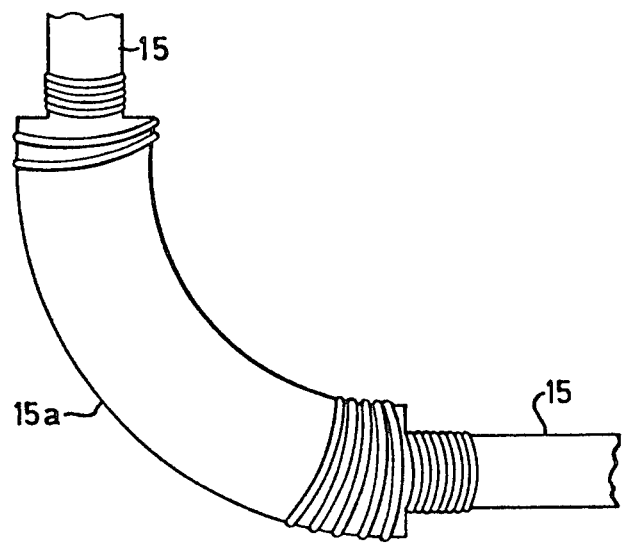
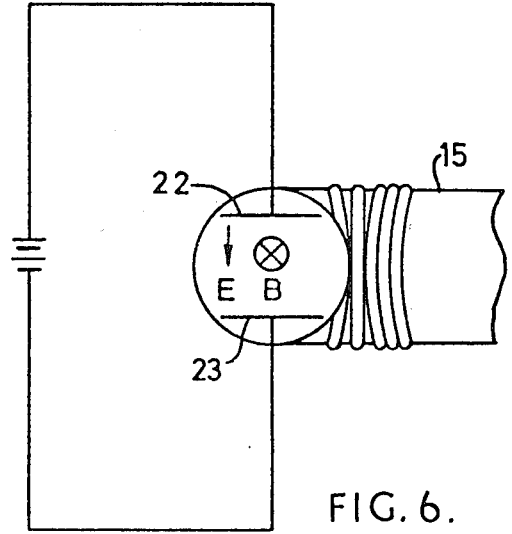
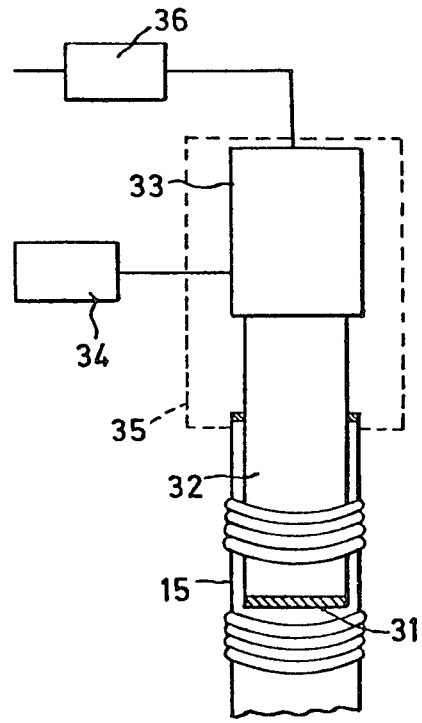

METHOD AND APPARATUS FOR MEASURING NEUTRON FLUX

This invention relates to a method and apparatus for measuring the neutron flux existing in the core or other regions of a nuclear reactor.

Most known devices for this purpose include a detector located in the nuclear reactor for generating an electrical signal related to the neutron flux, and an electrical cable for carrying the electrical signal from the detector to a region outside the reactor where the signal can be evaluated. This arrangement has the disadvantage that significant noise is produced in the cable due to the temperature of its surroundings, and this effect is particularly pronounced in nuclear reactors of high gamma-ray flux and high temperatures, such as most fast breeder reactors. There is also the possibility of damage to the cable.

It is an object of the present invention to provide an improved method and apparatus for measuring neutron flux in a nuclear reactor in which the above difficulties are effectively reduced.

The present invention consists in a method of measuring the neutron flux in a nuclear reactor which includes inserting a neutron sensitive material in the reactor, guiding electrons emitted by the neutron sensitive material through an evacuated tube to the exterior of the reactor with the aid of an axial magnetic field, and detecting electrons reaching the exterior of the reactor.

The invention further consists in apparatus for measuring the neutron flux in a nuclear reactor which includes an evacuated tube having adjacent one end neutron sensitive material, means for creating an axial magnetic field along the length of the tube for guiding along the tube electrons emitted by the neutron sensitive material, and means for detecting electrons reaching the other end of the tube.

In the accompanying drawings:

FIG. 1 shows diagrammatically apparatus according to the present invention applied to a nuclear reactor, FIG. 2 shows diagrammatically in more detail the apparatus used in FIG. 1, and FIGS. 3 to 7 shows various details and modifications of the apparatus shown in FIG. 2.

In carrying the invention into effect according to one convenient mode by way of example, FIG. 1 shows a nuclear reactor having a core 11 and shield 12 having a channel 13 into which extends a neutron flux detector 14.

As shown in FIG. 2, the detector includes a long tube 15 in which a vacuum of a low pressure is maintained and which contains near one end a disc 16 mounted in ring 17. The disc 16 contains or is composed of a neutron-sensitive material which when exposed to a neutron flux emits electrons by internal conversion (such as cadmium or gadolinium), by beta-decay (such as indium or silver) or by positron decay (such as silver). Alternatively, one may use a material (such as boron or uranium) which will produce positive ion emission which may generate several secondary electrons. However, the secondary electrons have a very low energy and must be accelerated, as shown in FIG. 3, by applying to the disc 16 a negative electric potential with respect to the tube 15 from a source 18 and using insulating material for the ring 17.

The tube 15 should be composed of a material having a high melting-point, small absorption cross-section and small and stable magnetic susceptibility under increased temperature. Materials such as aluminium, stainless steel, nickel or some refractory alloys such as molybdenum or tungsten alloys may be used.

The tube 15 is provided along its length with an axial magnetic field produced by a solenoid winding 19 energized from a power supply 20. This magnetic field serves to focus electrons emitted from disc 16 along the tube 15 by causing them to follow a spiral path 21.

The tube 15 is curved at a region along its length to avoid problems arising from neutron and gamma-ray streaming. When the electrons reach this curve they will continue to trace their spiral paths but will acquire a velocity component perpendicular to the plane containing the magnetic field and the radius of curvature.

To prevent some of the electrons from hitting the wall of the tube 15, the magnetic field may be increased in value over the curved section or, as shown in FIG. 5, the curved section 15a of the tube 15 may have a larger diameter. It should be noted that the two portions of the tube 15 on each side of secton 15a are in different planes.

FIG. 6 shows an alternative way of bending the electron path by using an electric field E between electrodes 22 and 23 in the tube 15 arranged so that the electric field is perpendicular to the magnetic field and its magnitude and sense is such that the spiralling electrons will follow the curvature of the tube 15. When the electrons leave the electric field they will be subjected solely to the magnetic field and will continue their spiral path. The electric field E and the magnetic field B should satisfy the inequality $|E| \leq c|B|$ where E is in Newton per coulomb, B is in weber per sq. meter and C is the velocity of light in meters/sec. One disadvantage here is that in the region of combined electric and magnetic fields the electron energy is not constant with time.

At the other end of the tube 15 there is provided an electron detector or collector 24 and the rate of arrival of electrons will be proportioned to the neutron flux detected. The detector or collector 24 may take the form, for example, of a thin window Geiger-Muller tube, channeltron, proportional counter, ionization chamber, semi-conductor detector or scintillation detector. The last four detectors may also be used as electron spectrometers as well.

FIG. 4 shows an arrangement using an electron collector 25 maintained at a position potential with respect to the tube 15 by means of source 26 to suppress electrons emitted from the surface of collector 25 when bombarded by incoming electrons. An output signal is produced by a sensitive electrometer 27.

FIG. 7 shows another arrangement using a scintillation electron detector 31 followed by a long light pipe 32 and a photomultiplier 33 whose high voltage is provided by power supply 34. The purpose of the light pipe 32 is to keep the photo-multiplier 33 away from the magnetic field since its efficiency drops drastically in a magnetic field. The light pipe 32 and the photo-multiplier 33 are located in a container 35 to prevent outside light reaching any of them. The signal from the photomultiplier 33 is then fed into a preamplifier 36 and to the rest of a conventional counting system.

Any intensive ambient gamma-ray field will cause electrons to be emitted from the wall of the tube 15 and from the neutron-sensitive material 16 due to photoelectric, compton and pair production effects. Those coming from the wall will follow a short spiral path and will return to the wall. A large proportion of those from the neutron-sensitive material will be lost because they have a high energy compared with the electrons emitted after neutron absorption and can be discriminated against if an electron spectrometer is used.

The main advantages of the detector described hereinabove are the absence of cable noise and radiation damage, insensitivity to an intense gamma-ray flux, the ability to choose a neutron-sensitive material whose burn-up characteristics are suitable for a particular application, a fast response time of the interval conversion type of detector and a relatively temperature insensitive performance. Any gamma field effects on the solenoid winding are negligible.

What I claim is:

1. A method of measuring the neutron flux in a nuclear reactor which includes inserting a neutron sensitive material in the reactor, generating an axial magnetic field along the length of an evacuated tube, guiding electrons emitted by the neutron sensitive material through the evacuated tube to the exterior of the reactor with the aid of the axial magnetic field, and detecting electrons reaching the exterior of the reactor.

2. A method as claimed in claim 1, wherein the electrons are guided along a curved path before being detected.

3. Apparatus for measuring the neutron flux in a nuclear reactor which includes an evacuated tube having adjacent one end neutron sensitive material, said end being inserted within the reactor means for creating an axial magnetic field along the length of the tube for guiding along the tube electrons emitted by the neutron sensitive material, to another end of said tube exterior of the reactor and means for detecting electrons reaching the other end of the tube.

4. Apparatus as claimed in claim 3, wherein the tube has a curved portion along its length.

5. Apparatus as claimed in claim 4, wherein the curved portion of the tube is of larger diameter.

6. Apparatus as claimed in claim 4, wherein the magnetic field over the curved portion is greater.

7. Apparatus as claimed in claim 4, wherein an electric field at right angles to the magnetic field is applied over the curved portion.

8. Apparatus as claimed in claim 3, wherein the neutron sensitive material is in the form of a disc in the tube.

9. Apparatus as claimed in claim 8, wherein the neutron sensitive material emits electrons by internal conversion.

10. Apparatus as claimed in claim 8, wherein the neutron-sensitive material emits electrons by beta decay.

11. Apparatus as claimed in claim 8, wherein the neutron-sensitive material emits electrons by positron decay.

12. Apparatus as claimed in claim 8, wherein the neutron-sensitive material produces positive ion emission which generates secondary electrons, means being provided for applying an electric field to accelerate the secondary electron along the tube.

13. Apparatus as claimed in claim 3, wherein the means for creating an axial magnetic field includes a solenoid winding around the tube.

* * * * *